Jan. 23, 1962 J. R. C. QUILTER 3,018,074
PARACHUTE PACK
Filed Sept. 5, 1958 4 Sheets-Sheet 1
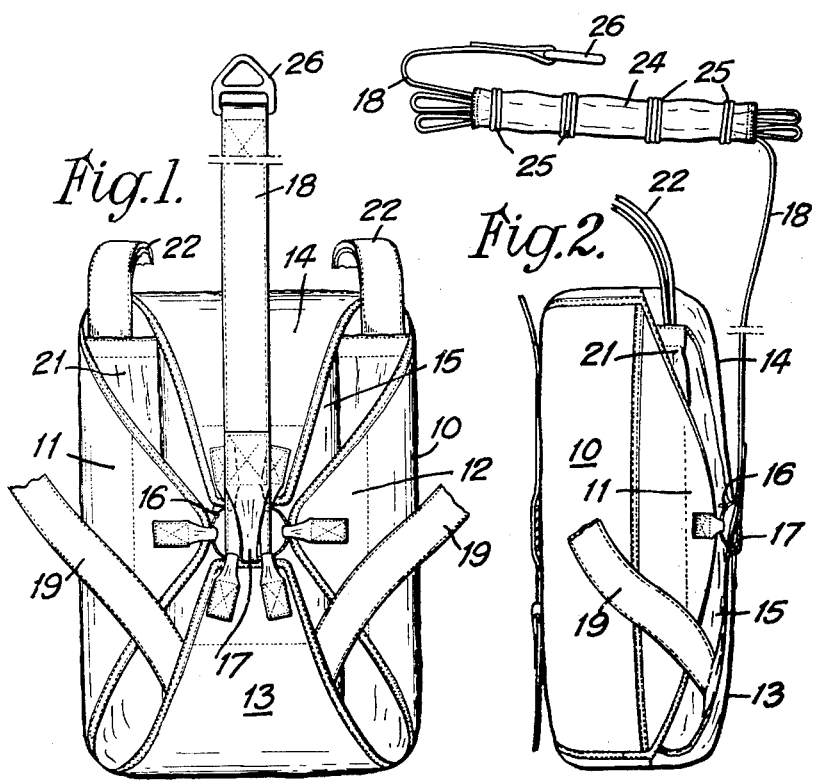
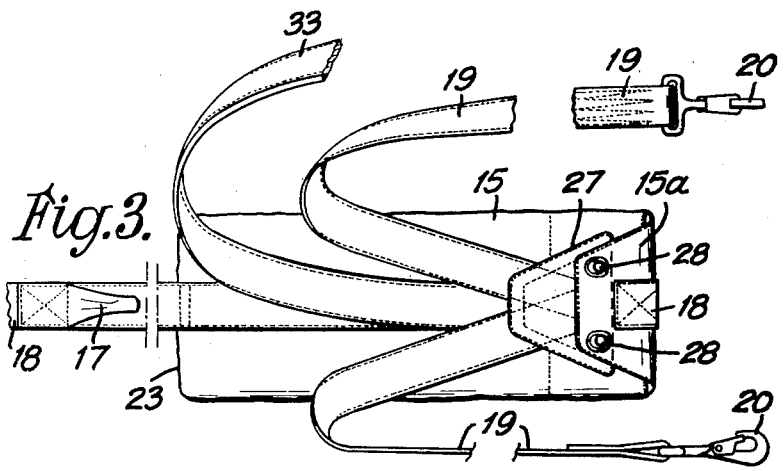
INVENTOR
Sir John R.C. Quilter, Bart.,
By Shoemaker & Mattare
ATTORNEYS Jan. 23, 1962 J. R. C. QUILTER 3,018,074
PARACHUTE PACK
Filed Sept. 5, 1958 4 Sheets-Sheet 2

INVENTOR
Sir John R.C. Quilter, Bart.
By Shoemaker & Mattare
ATTORNEYS

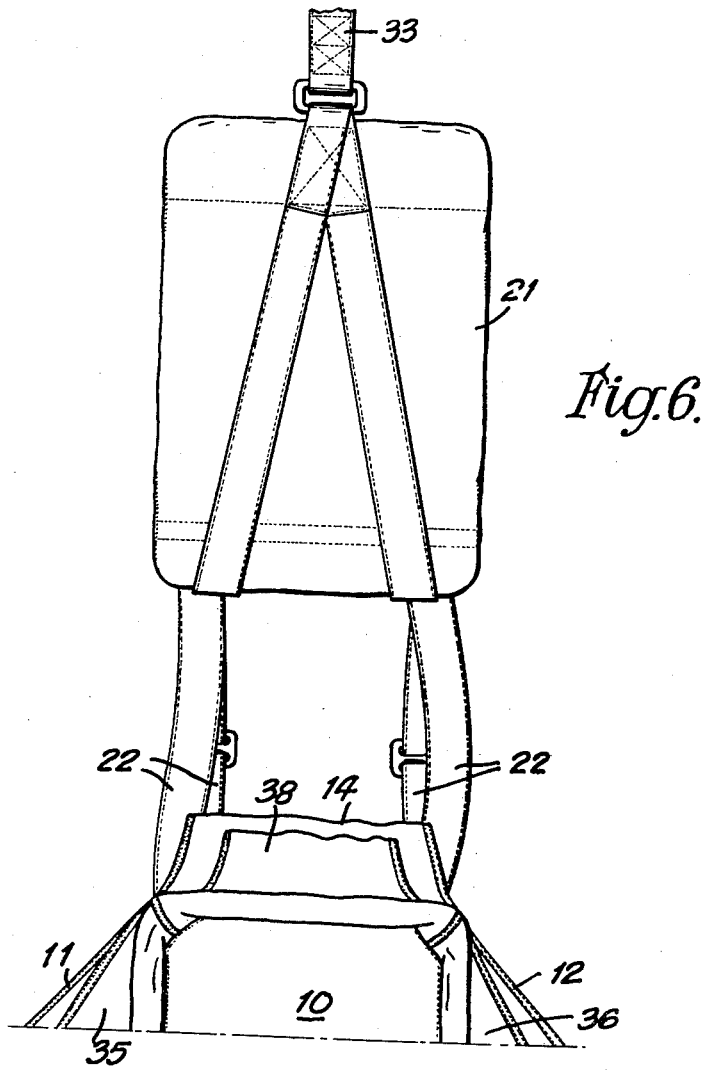

Jan. 23, 1962  J. R. C. QUILTER  3,018,074
PARACHUTE PACK
Filed Sept. 5, 1958  4 Sheets-Sheet 4
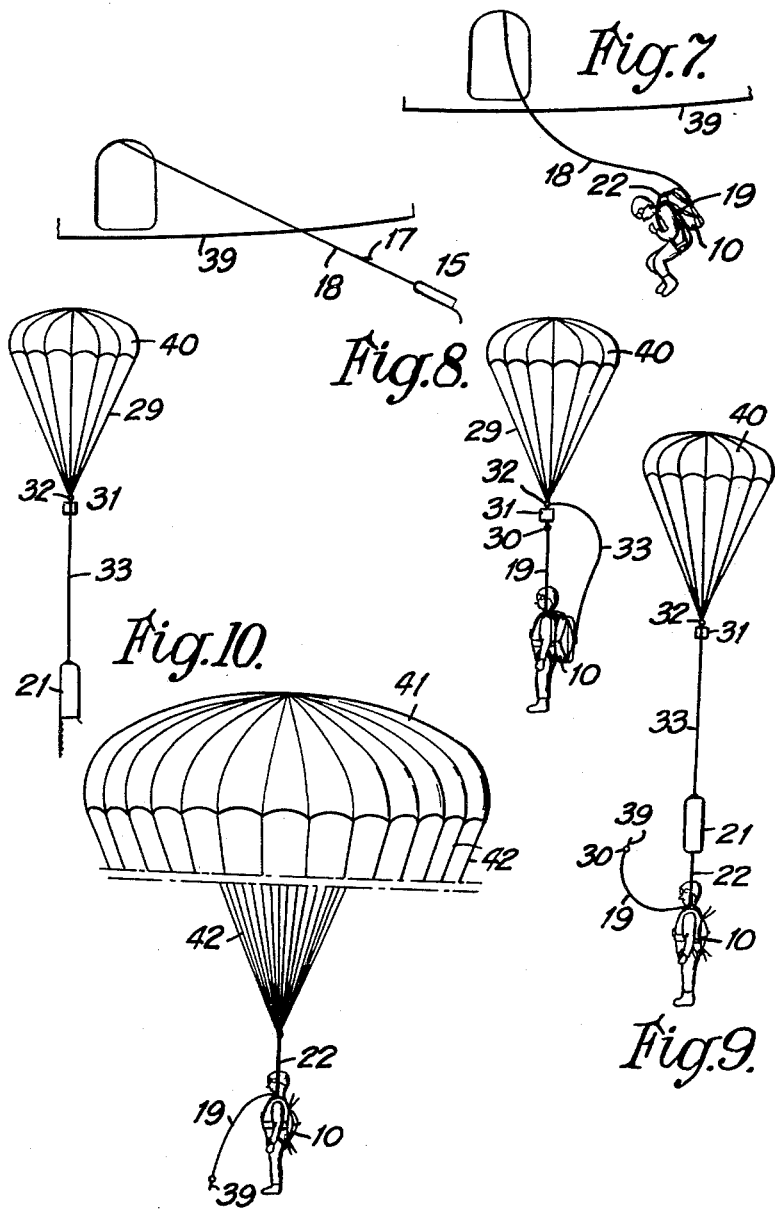
INVENTOR
Sir John R.C. Quilter, Bart.,
By Shoemaker & Mattare
ATTORNEYS

3,018,074
PARACHUTE PACK

John Raymond Cuthbert Quilter, Woking, England, assignor to G. Q. Parachute Company Limited, Woking, England, a British joint-stock company
Filed Sept. 5, 1958, Ser. No. 759,198
Claims priority, application Great Britain Sept. 9, 1957
4 Claims. (Cl. 244—147)

This invention relates to parachute packs of the kind adapted for static release.

The main object of the invention is to provide an improved pack of this kind, which can also be released manually if desired, particularly suitable for use with modern high-speed aircraft flying at high altitudes.

A specific object of the invention is to provide a parachute pack in which the release takes place in two stages, the first stage allowing for an initial and relatively weak support of the aviator or load, which support endures for a relatively short period, followed by the second stage in which the aviator or load is supported fully for a normal parachute descent.

Another object is to provide an improved parachute pack comprising auxiliary and main parachutes connected for sequential support of the load and released in two stages, the auxiliary parachute being extracted from the pack to afford an initial and relatively weak support of the load, to which it is connected through a delay-action mechanism operating after a relatively short period to disconnect the auxiliary parachute from the load, and the auxiliary parachute then operating to release the main parachute from the pack for descent with the load supported thereby.

In my prior United States Patent No. 2,396,126, issued March 5, 1946, there is described a pack parachute of this kind intended more particularly for use at low altitudes, as in the case of troops landed from low-flying aircraft.

With modern aircraft flying at much higher speeds and at much higher altitudes than at the date of the aforesaid patent, there is need for an improved pack parachute which will enable the troops or other load to be dropped from these aircraft without risk or failure. For example, if the pack parachute described in the aforesaid specification were used with a high-speed aircraft, the wind resistance would be so great that the static line, pack and emerging canopy would assume a sharply curved form instead of the straight-line form obtained in a drop from a low-speed aircraft; this is likely to result in a hooked deployment, in which the canopy becomes partly entangled with the shroud lines and therefore fails to open normally. In other circumstances, the main parachute might open too quickly, causing undue shock to the wearer and may be failure of the canopy fabric.

My present invention overcomes this difficulty by providing an initial and relatively weak support for a period allowing the load to fall quite clear of the aircraft before the main parachute comes into operation. The relatively weak support afforded by the auxiliary parachute may be for example one-half of the weight of the load.

Other objects and advantages of the invention will hereinafter appear from the following description of a preferred embodiment, given with reference to the accompanying drawings, in which:

FIG. 1 shows the complete parachute pack in closed condition, with a static line, lift-webs and other connections emerging therefrom.

FIG. 2 is a side view, with the static line folded over the pack.

FIG. 3 shows the container for the auxiliary parachute in closed condition, with the static line, lazy line and a harness connection from the auxiliary parachute.

FIG. 6 shows part of the parachute pack, in the fully open condition, with the main parachute container withdrawn therefrom.

FIGS. 7 to 10 are diagrams on a smaller scale, showing the two stages of the release of the parachutes.

Figure 4:
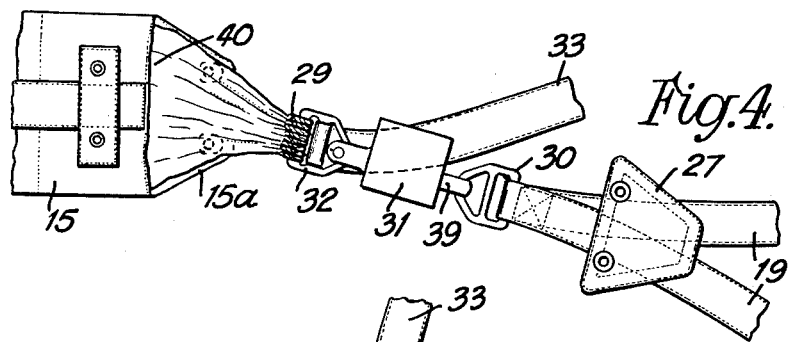
FIG. 4 shows one end of the auxiliary parachute container, in open condition, with the shroud lines partly withdrawn therefrom, the delay-action mechanism being interposed between these shroud lines and the auxiliary connection to the harness.

Referring to FIGS. 1 and 2, the pack comprises an outer bag 10 provided with closure flaps 11, 12, 13 and 14, fitting over a container 15 of elongated shape with a mouth at one end, in which an auxiliary parachute and its shroud lines are stowed, these flaps being normally held closed for example by a frangible tie 16 which is also engaged by a loop 17 upon a static line 18. A V-shaped strop 19 seen as emerging from beneath the lower flap 13, is connected at its apex to the auxiliary parachute, as later described, while its extremities are either permanently connected to the wearer's harness or fitted with snap-hooks 20 (see FIG. 3) for attachment to the harness, for example by D-shape rings on the front of the body. The main parachute and its shroud lines are stowed in an inner container 21, the lift-webs 22 extending to the harness in the conventional manner from the main parachute shroud lines inside the container 21.

FIG. 2 shows the preferred manner of folding the static line 18 prior to use. One end of this line is secured to the closed end 23 of the container, as seen in FIG. 3, and stitched along the back and front, but leaving the mouth and its flap 15a free for extraction of the parachute; the line 18 then passes back down the front of the container to near the mouth of the latter, where it is formed with the loop 17 which engages the frangible tie 16, as seen in FIGS. 1 and 2. From this point, the line proceeds into a cover 24, inside which it is folded back and forth, the cover being held closed by elastic ties 25; the other end of the line 18 is fitted with a shackle 26 for attachment to the aircraft. When the aviator falls from the aircraft, after having attached the shackle 26 thereto, the line 18 will pull out of its cover 24 and unfold to its full length. Thereupon the loop 17 acting upon the tie 16 will break the latter and allow the flaps 11–14 to open and release the container 15.

Figure 5:
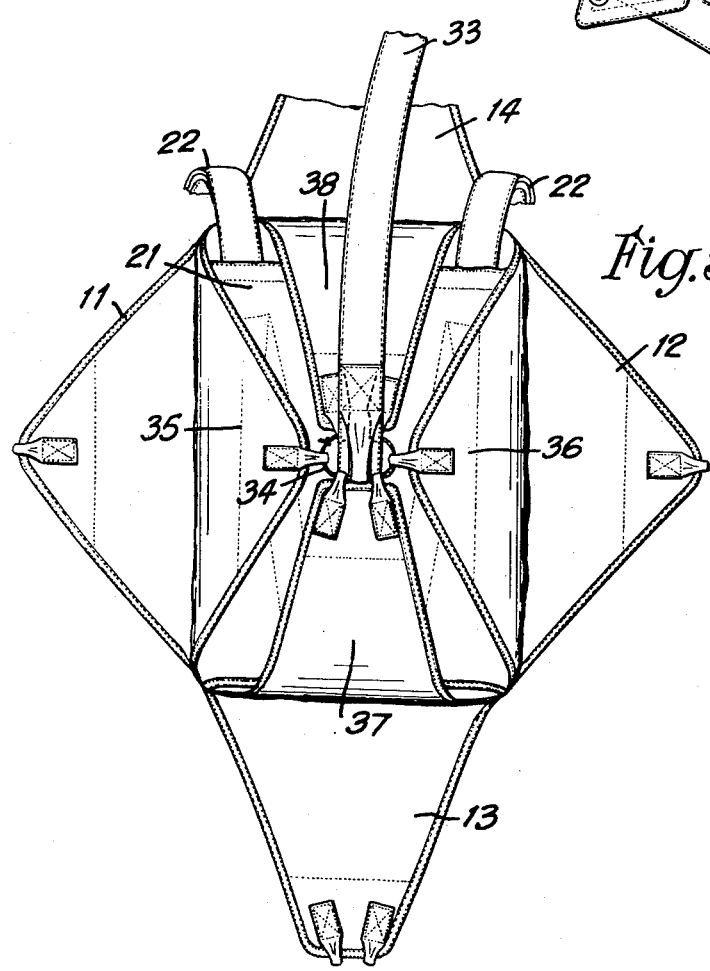
FIG. 5 is a view similar to FIG. 1, but with the outer closure flaps open, the auxiliary parachute container having been released by the pull of the static line.

When released from the pack, the container 15 remains connected to the harness by the V-shaped strop 19; this strop is temporarily held at the mouth of the container by a yoke 27 stitched to the strop and engaged together with the flap 15a upon the studs of snap-fasteners 28 on the container, as seen in FIG. 3. The pull of the static line 18 upon the container 15 is now transmitted to the harness through the strop 19, which forces the yoke 27 off the container and starts to withdraw the shroud lines 29 of the auxiliary parachute, as seen in FIG. 4; a D-ring 30 at the apex of the strop 19 is shown attached to a delay-action mechanism 31, which in turn is attached to a D-ring 32 secured to the shroud lines 29. To the D-ring 32, there is also attached a lazy-line 33 extending into the pack, as seen in FIG. 5, but previously covered by the container 15 and the closed outer flaps 11, 12 and 14. This end of the line 33 is engaged with a frangible tie 34 which normally holds inner closure flaps 35, 36, 37, 38 of the pack over the container 21 in which the main parachute and its shroud lines are stowed; the extremity of the line 33 is attached to the container 21, so that after the pull has broken the tie 34, this line will withdraw the container 21 from the pack, as shown in FIG. 6.

The delay-action mechanism 31 may be of any suitable type, preferably clockwork, such as disclosed in the United States patent to Martin, No. 2,708,083, and adapted to be tripped by the auxiliary parachute when the latter comes into operation.

When the auxiliary parachute has been withdrawn from the container 15, the inflation of its canopy causes the D-ring 32 to pull upon the delay-action mechanism 31, which in turn pulls upon the D-ring 30 and the V-strop 19 to support the aviator in the initial stage. The supporting force is relatively weak due to the small size of the canopy being equal for example to half the weight of the aviator and his equipment; the delay-action mechanism will be set or adjusted so as to be tripped into operation by this supporting force, which tends to withdraw a plunger 39 from the mechanism 31. The speed of withdrawal is regulated by the clockwork, for example to a period of 2 seconds; at the expiration of that period, the plunger is released and the auxiliary parachute thereby disconnected from the V-strop 19. The pull of the auxiliary parachute is now transferred to the lazy line 33, which breaks the frangible tie 34 holding the inner closure flaps 35–38 over the main parachute container 21 and pulls the latter out of the pack, as seen in FIG. 6, the container remaining attached to the line 33 while the main parachute deploys therefrom, the weight of the aviator acting through the lift webs 22 in the normal manner. The aviator will then descend with the main parachute fully deployed, as seen in FIG. 10, while the auxiliary parachute may float away together with the delay-action mechanism 31, lazy line 33 and container 21, independently of the main parachute and aviator, who retains only the outer bag 10 secured to his harness.

In operation, the aviator will have the pack secured to his harness, for example on his back, with the folded static line 18 laid in any convenient position beside him, and the V-strop 19 attached to his harness, either permanently or by snapping the hooks 20 upon rings at the front. If he is to leave the aircraft, either by jumping or by ejection, with or without his seat, he may fix the static line 18 to a suitable point of the aircraft, as by engaging the D-ring 26 upon a convenient anchorage therein. After he has left the aircraft 39, as shown in FIG. 7, the static line 18, having its shackle 26 attached to the aircraft, will pull out of its cover 24 and unfold to its full length, until the loop 17 breaks the tie 16 of the outer bag 10 and the line pulls out the container 15. The transfer of the pull to the V-strop 19 and its yoke 27 will open the container 15 and withdraw the delay-action mechanism 31, followed by the auxiliary parachute 40, which will deploy to give the aviator a relatively weak support, this condition being shown in FIG. 8. This support will continue for a period determined by the setting of the delay-action mechanism 31, for example 2 seconds, which terminates the first stage of the parachute release, during which the man is supported through the V-strop 19 attached at one end to his shoulders or harness and at the other end to said mechanism.

When the aforesaid period has elapsed, the delay-action mechanism will release the auxiliary parachute 40 from the V-strop 19, but the connection by the lazy line 33 will sustain the container 21 of the main parachute, as shown in FIG. 9; the auxiliary parachute 40 then floats away together with the delay-action mechanism 31, leaving only the V-strop 19 connected to the harness, either directly or by the hooks 20. The main parachute 41 will deploy substantially in the normal manner, as shown in FIG. 10, for descent with the aviator but independently of the auxiliary parachute, this being the second stage of the release.

It will be understood that if the pack is provided with a manual release, instead of being operated by a static line, the aviator will be able to release the container 15 at a selected moment after leaving the aircraft, the deployment of the auxiliary parachute, the operation of the delay-action mechanism and the release of the main parachute all taking place as above described.

The invention, which can obviously be applied to the dropping of supplies and other loads by parachute, is not limited to the particular details described.

What I claim is:

1. A parachute pack comprising a main parachute, a first container for said main parachute, an auxiliary parachute, a second container for said auxiliary parachute, a first connecting means for securing said second container to a load, said first connecting means being releasably attached to said second container, a second connecting means for securing said auxiliary parachute to said first container, a third connecting means for securing said main parachute to the load, a delay-action mechanism connecting said first connecting means to said auxiliary parachute and adapted to release said first connecting means, and a static line adapted to release said second container for deployment of said auxiliary parachute, said auxiliary parachute then affording a relatively weak support to said load by said first connecting means until said delay-action mechanism operates to release said first connecting means, whereupon said auxiliary parachute causes said second connecting means to remove said first container from said main parachute, the latter then descending with the load supported by said third connecting means.

2. A parachute pack comprising a main parachute, a first container for said main parachute, an auxiliary parachute, a second container for said auxiliary parachute, a first connecting means for securing said second container to a load, said first connecting means being releasably attached to said second container, a second connecting means for securing said auxiliary parachute to said first container, a third connecting means for securing said main parachute to the load, a delay-action mechanism connecting said first connecting means to said auxiliary parachute and adapted to release said first connecting means, and a static line tensioned by initial descent of the load from an aircraft to separate said second container from said auxiliary parachute, said auxiliary parachute then affording a relatively weak support to said load by said first connecting means, said delay-action mechanism then becoming operative after a relatively short period to release said first connecting means, and said auxiliary parachute then becoming operative to separate said first container from said main parachute for descent with the load supported thereby.

3. A parachute pack comprising a main parachute, a first container for said main parachute, an auxiliary parachute, a second container for said auxiliary parachute, a first connecting means for securing said second container to a load, said first connecting means being releasably attached to said second container, a second connecting means for securing said auxiliary parachute to said first container, an outer bag for both said containers, said outer bag being secured to the load, a third connecting means for securing said main parachute to the load, a delay-action mechanism connecting said first connecting means to said auxiliary parachute and adapted to release said first connecting means, means for opening said outer bag after the load has left an aircraft, and means for releasing said auxiliary parachute from said second container, said auxiliary parachute then affording a relatively weak support to said load by said first connecting means until said delay-action mechanism operates to disconnect said first connecting means, and said auxiliary parachute then becoming operative to release said main parachute from its container by said second connecting means for descent with the load supported thereby.

4. A parachute pack comprising a main parachute, a first container for said main parachute, an auxiliary parachute, a second container for said auxiliary parachute, said second container being of elongated shape and having a mouth flap at one end, an outer bag having flaps for enclosing both said containers, a forked strop releasably secured at one end to the mouth flap of said second container, the other end of said strop having its forks connected to a load, a line connected to said auxiliary parachute inside said second container, said line having its other end connected to said first container, connections for securing said main parachute to the load, a delay-action mechanism connecting said forked strop to said auxiliary parachute and adapted to release said strop, and a static line for opening said outer bag and withdrawing said second container for release of said auxiliary parachute, said delay-action mechanism operating thereafter to release said strop, said auxiliary parachute then removing said first container from said main parachute and the latter deploying for descent with the load supported by said connections.

References Cited in the file of this patent

UNITED STATES PATENTS

| | | |
|---|---|---|
| 2,042,159 | Mohler | May 26, 1936 |
| 2,389,578 | Quilter | Nov. 20, 1945 |
| 2,396,126 | Quilter et al. | Mar. 5, 1946 |
| 2,405,333 | Sheridan | Aug. 6, 1946 |
| 2,439,318 | Quilter | Apr. 6, 1948 |
| 2,663,525 | Smith | Dec. 22, 1953 |
| 2,675,198 | Reihman | Apr. 13, 1954 |
| 2,676,655 | Hatfield | Apr. 27, 1954 |
| 2,708,083 | Martin | May 10, 1955 |
| 2,712,423 | John | July 5, 1955 |

FOREIGN PATENTS

| | | |
|---|---|---|
| 1,044,509 | France | June 17, 1953 |
| 931,870 | Germany | Aug. 18, 1955 |
| 748,022 | Great Britain | Apr. 18, 1956 |
| 953,853 | Germany | Dec. 6, 1956 |
| 1,166,142 | France | June 23, 1958 |

OTHER REFERENCES

Ser. No. 381,154, Dreyfus (A.P.C.), published June 8, 1943.

Ser. No. 390,181, Hehs (A.P.C.), published May 25, 1943.